United States Patent [19]
Hartmann

[11] 3,955,242
[45] May 11, 1976

[54] PROCESS AND APPARATUS FOR FILLETING FISH

[75] Inventor: Franz Hartmann, Bad Oldesloe, Germany

[73] Assignee: Nordischer Maschinenbau Rud. Baader, Lubeck, Germany

[22] Filed: Apr. 1, 1974

[21] Appl. No.: 457,085

[30] Foreign Application Priority Data

Apr. 4, 1973   Germany............................ 2316791

[52] U.S. Cl......................................... 17/57; 17/32
[51] Int. Cl.².......................................... A22C 25/16
[58] Field of Search............................ 17/57, 56, 52

[56] References Cited
UNITED STATES PATENTS

| | | | |
|---|---|---|---|
| 1,639,976 | 8/1927 | Barry | 17/56 |
| 2,149,021 | 2/1939 | Hunt | 17/57 |
| 2,325,680 | 8/1943 | Hunt | 17/57 |
| 2,704,378 | 3/1955 | Schlichting | 17/57 |
| 2,832,988 | 5/1958 | Schlichting | 17/52 |
| 3,525,120 | 8/1970 | Jobmann | 17/57 |
| 3,570,048 | 3/1971 | Michael | 17/56 |

FOREIGN PATENTS OR APPLICATIONS

| | | | |
|---|---|---|---|
| 115,643 | 7/1968 | Norway | 17/57 |
| 1,454,082 | 2/1971 | Germany | 17/57 |
| 100,444 | 12/1940 | Sweden | 17/57 |
| 392,668 | 5/1933 | United Kingdom | 17/57 |

*Primary Examiner*—Louis G. Mancene
*Assistant Examiner*—James D. Hamilton
*Attorney, Agent, or Firm*—Edward F. Levy

[57] ABSTRACT

A method and apparatus for filleting fishes is disclosed. The fish are cut on their underside by pairs of belly knives and pairs of rib knives, and by pairs of back knives on their dorsal sides. Between the belly knives and the rib knives are pairs of guide strips which guide the lower tail fin on the lower belly spines. Following the rib knives, a further pair of guides are provided and beneath these guides is a conveyor which acts on the underside of the backbone. Between the belly knives and the back knives, pairs of dorsal guides are provided in overlapping relationship. These individual guides are capable of adjustment to suit the shape of the fish.

8 Claims, 8 Drawing Figures

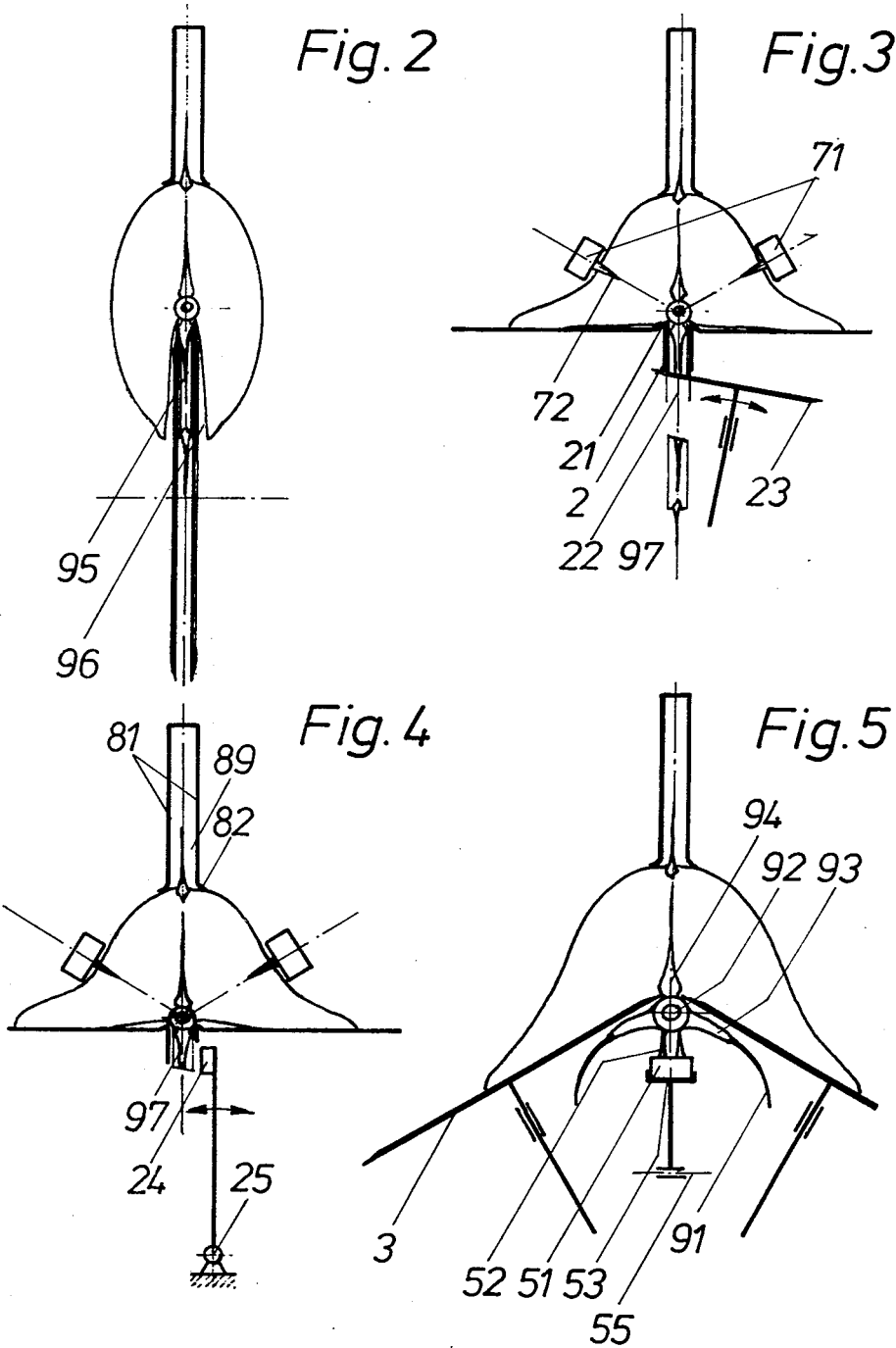

PROCESS AND APPARATUS FOR FILLETING FISH

BACKGROUND OF THE INVENTION

The invention relates to a method and apparatus for filleting fishes by cutting into the fishes whilst they are conveyed with the belly facing downwards and with the tail leading. In methods of this kind, for example as described in published Norwegian Patent 3852/68, the lower half of the tail fin, and a strip of bone structure that contains the belly spines, is guided in a vertically adjustable rectilinear path while a continuous guide rail, or individual guide flaps disposed upstream of the tools, are used for guiding the back. While the rib cuts and back cuts are made, the fishes can be conveyed solely or additionally by action on the spinal column from the belly side of the fish.

Whilst with this prior construction it is possible to obtain a high through-put rate, it is practically impossible for the fillets to be cut out neatly as far as the tail root. Moreover, correctly timed termination of the cut which cuts free the belly flaps from the ribs and the vertebral appendages, is not possible so that the yield is lower than is theoretically possible owing to the loss of meat at these two positions.

Other methods suffer from the disadvantage of requiring tail clips, sliding saddles or the like for conveying the fish. These have to circulate at fixed intervals so that the through-put rate is greatly reduced when smaller fishes are being processed.

SUMMARY OF THE INVENTION

It is an object of the invention to avoid the disadvantages referred to above, and to obtain a high through-put rate without requiring a construction in which the fish have to pass through at a regular rhythm.

In accordance with one aspect of the present invention, in a method of filleting fish, the fish are conveyed with the belly facing downwards and with the tail leading, and cuts are made to free flesh from the ribs, vertebral appendages and backbone whilst the upper half of the tail fin and the dorsal fins are guided in an uninterrupted path by guides which are height adjustable in dependence on the varying height along the length of the fish, and the conveying being performed, until the ribs are cut free, by means engaging the flanks of the fish from the outside, and the conveying being performed, after the ribs are cut free and until the fillets are cut off the bone structure, by action upon the underside of the vertebrae.

According to another aspect of the invention, a fish filleting machine includes one pair each of circular belly spine knives, rib knives and back knives, a first pair of guides positioned between the belly spine knives and the rib knives, and a second pair of guides being positioned between the rib knives and the back knives both for guiding the bottom half of the tail fin and the strip of the skeleton containing the belly spines and produced by the belly knives, further pairs of guides being positioned between the belly knives and the back knives for guiding the upper half of the tail fin and the dorsal fins, the further pair of guides being height adjustable and having adjacent ends which overlap in a direction opposite to the fish conveying direction, the guides of each further pair enclosing a slit that is disposed in the plane of symmetry of the knives, and being mounted for vertical deflection upwards, a first conveyor for engaging the flanks of the fish from the outside until the ribs are cut free, and a further conveyor for engaging the underside of the vertebrae after the ribs are cut free and until the fillets are cut off the bone structure.

Each of the guides of a further pair may be secured one to the other and the pair being secured to an arm which is pivotable about an axis on a machine frame, downward movement of the pair being limited by a stop.

The further conveyor conveniently comprises an endless chain provided with spikes and the conveyor may be supported at least in part by one or more resilient pressure rails.

DESCRIPTION OF THE PREFERRED EMBODIMENT

Figure 1:
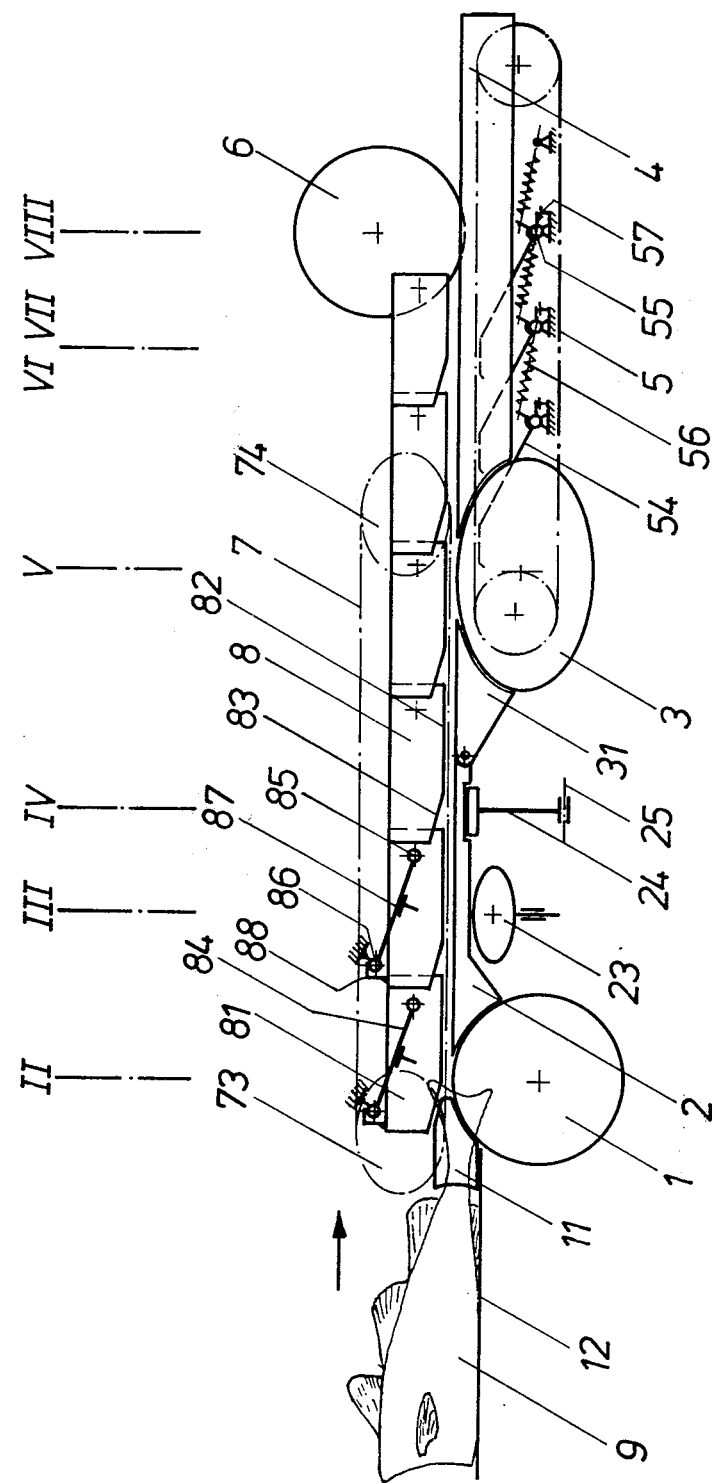

The invention may be carried into practice in various ways but one specific embodiment will now be described by way of example, with reference to the accompanying diagrammatic drawings, in which:

FIG. 1 is a side elevation of a filleting machine, according to the invention, and FIGS. 2 – 8 are sectional side elevations taken on the lines II – VIII respectively in FIG. 1.

FIG. 1 illustrates a filleting machine which includes a pair of circular belly knives 1 arranged vertically and parallel to one another, a pair of inclined rib knives 3 and a pair of vertical, parallel, back knives 6. All the knives are rotatably supported in fixed bearings in a machine frame and are driven in well known manner. Whilst the rib knives 3, as shown in FIG. 5, are inclined to each other at an angle of approximately 120°, other orientations are possible. Positioned downstream of the belly knives 1 are a pair of rigid guide strips, bars or rails, hereafter called strips 2 which have vertically spaced faces, as shown in FIG. 3, to enclose a gap 22 between them which extends towards the rib knives 3 and to a pair of adjustable guide flaps 31 disposed downstream of the guides 2 and the operation of which will be described. In the region of FIG. 3 and FIG. 4, the guide strips 2 also have horizontal surfaces for guiding parts of the fish as shown. These horizontal vertical surfaces meet at a rib 21 which is employed to support the backbone of the fish.

Positioned at the forward end of the guide strips 2 is a single bone knife 23, shown in FIG. 3, which comprises a circular knife adapted to pass either below the guide strips 2 or through a slit formed in the side wall of one or both strips. A pair of bone knives inclined to one another can, alternatively, be used. The bone knives are biased to a position in which they cut the belly spines which are guided in the gap 22 between the guide strips 2. As shown by the arrows in FIG. 3, the bone knife 23 is pivotally mounted for arcuate movement between operative and inoperative positions. It is so disposed that it cuts at a distance of 15 – 20 millimeters below the top edges of the guide strips 2.

Positioned downstream of the bone knife 23 is a feeler or sensor 24 which extends into a gap between the two guide strips 2. If necessary, one guide strip may be provided with an aperture to receive the feeler 24 as shown in FIG. 4. The feeler is mounted on an arm pivoted at 25 for arcuate movement in the direction of the arrows shown in FIG. 4. The guide flaps 31, which have already been referred to, merge at their forward ends with the contour of the rib knives 3 and are adapted to be raised or lowered, in a manner known in the art, to control the timing of the cuts of the rib knives on the fish. The timing of the movement of the guide flaps 31 is controlled by means of suitable electronic or mechanical interconnecting means between the guide flaps 31 and the sensor 24 which may include a memory device.

Figure 6:
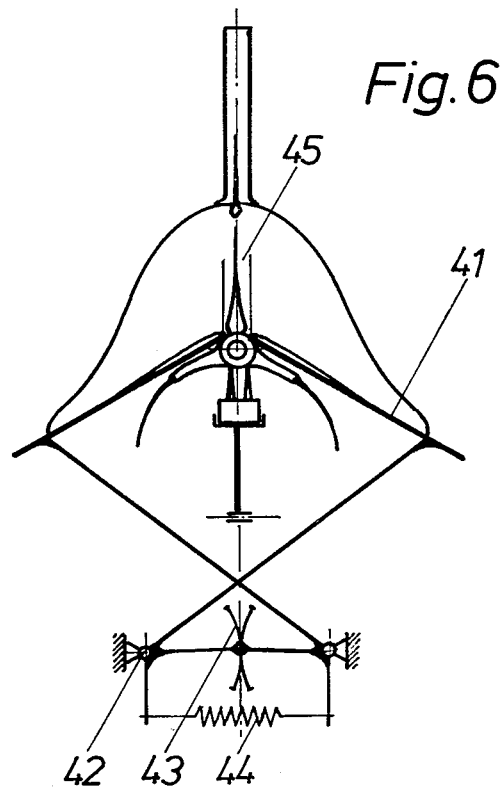
Figure 7:
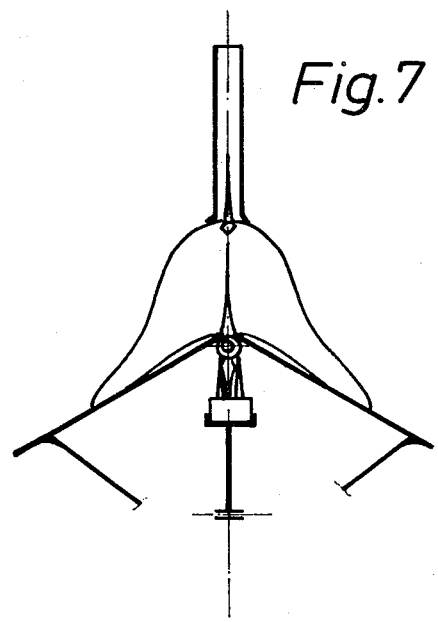
Figure 8:
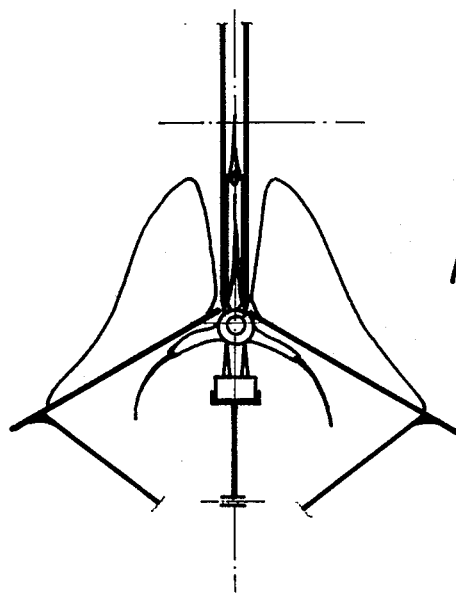

Downstream of the rib knives 3 are a pair of guides generally indicated at 4 in FIG. 1, which merge their upstream ends with the contour of the knives 3 and which extend to and beyond the underside of the back knives 6. As shown in FIG. 6, the guides 4 comprise a pair of guide plates 41 disposed approximately in the inclined planes of the rib knives 3 and each being pivotable about axis 42 lying parallel to one another and being coupled by synchronizing means 43. The guides 41 are held by a spring 44 against a stop abutment, not shown, so that a gap 45 enclosed by their top edges is sufficient for admitting the backbones of the smallest fish.

Referring to FIGS. 1 and 5, disposed between the rib knives 3 and the back knives 6 and at a level below the guides 4 is an endless conveyor 5 comprising a chain 51 carrying two spaced rows of spikes 52. The chain 51 is supported by a plurality of pressure rails 53 which are pivotable about an axis 55 and which are held by springs 56 (see FIG. 1) against stop abutments 57 that are fixed with respect to the frame so that the spikes 52 pass closely under the gap 45 between the guides 41.

On its upper side, the machine includes a series of overlapping pairs of guides 81 whose adjacent ends overlap one another in the direction opposite to the conveying direction of the fish. This series of guides forms a back guide 8 above the path of the fish and which extends from above the belly knives 1 to a position adjacent the back knives 6. Each of the pairs of guides encloses a slit 89 (see FIG. 4) and is supported on the free end 85 of a radius arm 84 which is pivotable about an axis 86 fixed to the frame and is supported by means of a stop abutment 88 adjacent the axis 86. The downward movement of the radius arm 84 is limited by a stop abutment 87 which is fixed with respect to the machine frame. The bottom edge of each pair of guides extends parallel to the top edge of the guide strips 2. On the inlet side of each pair of guides there are run-up surfaces 83 which may in turn be provided with V-shaped edges. In the interest of simplicity, the radius arms and stop abutments are only shown for the first two pairs of guides.

Referring to FIGS. 1, 3 and 4 a belly conveyor 7 comprises a pair of conveyor belts 71 mounted one adjacent each flank of the fish. The conveyor extends from above the belly knives to above the rib knives 3. The conveyor belts 71 are provided with spikes 72 and are adapted to move in inclined planes which are symmetrically disposed to one another and which are deflected synchronously in relation to one another to accommodate different sizes of fish. They are positioned so that their spikes 72 point into the space which is left free between the top edges of the strips 2 and the bottom edges of the pairs of guides 81.

The method of operation is as follows. A beheaded fish 9 (see FIG. 1) whose belly cavity has been cleaned, is pushed, for example through a V-shaped trough 12, up to the belly spine knives 1 in front of which it is accurately aligned by an inlet 11 and is then gripped and conveyed by the spikes on the conveyor belts 71. As a consequence, the fish is moved to the right in FIG. 1 and, as a consequence, the belly spine knives 1 cut into the flesh from the root of the tail up to the belly cavity on each side of the belly spines which depend from the backbone in this region. The cuts made by the knives 1 extend up to the backbone. Thereafter, the backbone is supported by the rib 21 of the guides 2 whilst the belly spines are guided between the vertical faces of the guide strips 2, i.e., in the gap 22. This also receives the lower part of the tail fin. Whilst advancing on these guide strips, the belly spines are cut by the bone knife 23 to the same depth below the vertebrae 92. The remaining strip 97 (see FIG. 4) is sensed by the sensor 24 during the further course of the feeding motion. When the strip 97 ceases to deflect the sensor 24 during the commencement of the passage of the belly cavity, the sensor will supply a pulse to a mechanical or electronic mechanism which will cause the guide flaps 31 to be lowered in front of the rib knives 3, with an appropriate delay, so that the said rib knives are able to cut free the ribs 91 and the vertebral appendages 93 shown in FIG. 5. Thereafter, the guide plates 41 penetrate into the cuts made by the rib knives 3 and these guide plates centre the backbone 94 between them and support the vertebrae 92 of the backbone whilst the spikes 52 of the chain 51 engages the bones from below under the action of the springs 56 and convey the fish to the back knives 6. At this time, the fish is still guided by the guide pairs 81.

Simultaneously with the run-in of the lower tail fin half between the knives 1, the upper tail fin half runs into the gap 89 between the first pair of guides 81 and thus are lifted upwards by the back of the fish during the further conveyor movement while on further advance of the fish the guide is lowered again in guiding the back fins. At the same time, it guides the top tail fin half and the dorsal fins into the gap 89 of the next pair of guides 81 and these pairs of guide plates adapt themselves to the different height and length of the back of the fish. In this way, the fish is constantly guided by its back whilst passing the knives until the last pair of guides 81 guide the fins between the back knives.

By virtue of this arrangement, uninterrupted guiding of the back with a consequent adaptation of the guides to the individual shape of the fish permits the knives to be adjusted to obtain a degree of economy and flesh severance which is not otherwise obtainable. This is particularly applicable to a method in which the fish are fed tail-leading, and enables accurate guiding and excellent flesh yield to be obtained with a high speed of operation and a consequent high throughput rate.

By severing the belly-spines the fish can be reliably guided. Moreover the conveying of the fish by action on the vertebrae using a deflectable conveyor is also facilitated.

The various novel integers described make it possible to vary the specific construction very readily for processing different sizes of fish.

Any kind of transmission and memory or storage mechanism may be provided for operating the guide flaps 31 and the rib knives 3 from the sensor 24. The use of memory mechanism enables further different tools to be controlled at different distances from the single sensor, and at different times within the machine.

What we claim as our invention and desire to secure by letters patent is:

1. A fish filleting machine which includes one pair each of circular belly spine knives, rib knives and back knives, said pairs of knives being spaced from each other along the length of said machine, conveyor means for transporting fish belly side down and tail leading successively past said belly spine knives, rib knives and back knives, a first pair of lower guides positioned between the belly spine knives and the rib knives, and a second pair of lower guides positioned between the rib knives and the back knives both for continuously guiding the bottom half of the tail fin and the strip of the skeleton containing the belly spines and produced by the belly knives, further pairs of upper guides positioned between the belly knives and the back knives for guiding the upper half of the tail fin and the dorsal fins, the further pairs of upper guides having adjacent ends which overlap in a direction opposite to the fish conveying direction, means mounting each of said further pairs of upper guides for vertical deflection upward as a fish is conveyed therebeneath, whereby said further pairs of upper guides are individually adjustable to height variations in said fish, the guides of each further pair of upper guides enclosing a slit that is disposed in the plane of symmetry of the knives, a first conveyor engaging the flanks of the fish from the outside until the ribs are cut free, and a further conveyor engaging the underside of the vertebrae after the ribs are cut free and until the fillets are cut off the bone structure.

2. A machine as claimed in claim 1 in which each of the guides of each further pair of upper guides are secured one to the other, said machine further including an arm secured to each pair of upper guides, each said arm being pivotable about an axis on a machine frame, and a stop limiting downward movement of the pair.

3. A machine as claimed in claim 1 wherein the guides of each further pair of upper guides have straight lower edges merging into lead-in edges which are upwardly inclined in a direction opposite to the direction in which said fish are transported.

4. A machine as claimed in claim 1 in which the second pair of lower guides comprises inclined plates which can be moved apart in synchronism against a spring force to leave a gap for the passage of the backbone.

5. A machine as claimed in claim 1 in which said further conveyor comprises an endless chain provided with spikes.

6. A machine as claimed in claim 5 in which the further conveyor is supported at least in part by one or more resiliently deflectable pressure rails.

7. A machine as claimed in claim 5 in which the first conveyor comprises two endless belts provided with spikes and adapted to engage flanks of fish in two planes which subtend below them an obtuse angle.

8. A method of filleting fish comprising the steps of
conveying the fish with the belly facing downwards and with the tail leading,
making cuts to free the ribs, vertebral apendages and backbone from the surrounding flesh of the fish while guiding the upper half of the tail fin and dorsal fins in an uninterrupted path by guides which are height adjustable in dependence on the varying height along the length of the fish, and simultaneously conveying the fish by engaging and gripping the flanks of the fish from the outside until the ribs are cut free,
and thereafter conveying the fish by action upon the underside of the vertebrae until the fillets are cut off the bone structure.

* * * * *